United States Patent [19]
Barlow

[11] 4,073,496
[45] Feb. 14, 1978

[54] PHONOGRAPH DEVICE

[75] Inventor: Gordon A. Barlow, Skokie, Ill.

[73] Assignee: Marvin Glass & Associates, Chicago, Ill.

[21] Appl. No.: 672,319

[22] Filed: Mar. 31, 1976

[51] Int. Cl.$^2$ ............................................. G11B 25/04
[52] U.S. Cl. .................................................. 274/9 B
[58] Field of Search .............. 274/9 R, 9 C, 1 A, 9 B

[56] References Cited
U.S. PATENT DOCUMENTS

| 2,939,713 | 6/1960 | Winter | 274/9 R |
| 3,178,188 | 4/1965 | Lea | 274/9 R |
| 3,238,644 | 3/1966 | Hayes | 274/1 A |
| 3,666,274 | 5/1972 | Fox et al. | 274/9 B |

*Primary Examiner*—Harry N. Haroian
*Attorney, Agent, or Firm*—Mason, Kolehmainen, Rathburn & Wyss

[57] ABSTRACT

A toy phonograph for indexed playing of spaced concentric sections of interchangeable disc records. The phonograph includes an overcentering mechanism associated with a cam operated switch which is actuated by the introduction of a record through a slot in the front of the housing to initiate playing of the record, as well as an eject button for stopping play and ejecting the record from the phonograph. When a new record is inserted, the overcentering mechanism and the cam interact to automatically start the phonograph to play the new record. The tone arm automatically is indexed radially to play the next concentric record section upon each interchanging of a record and is returned to the first record section after playing the last section on the record.

10 Claims, 10 Drawing Figures

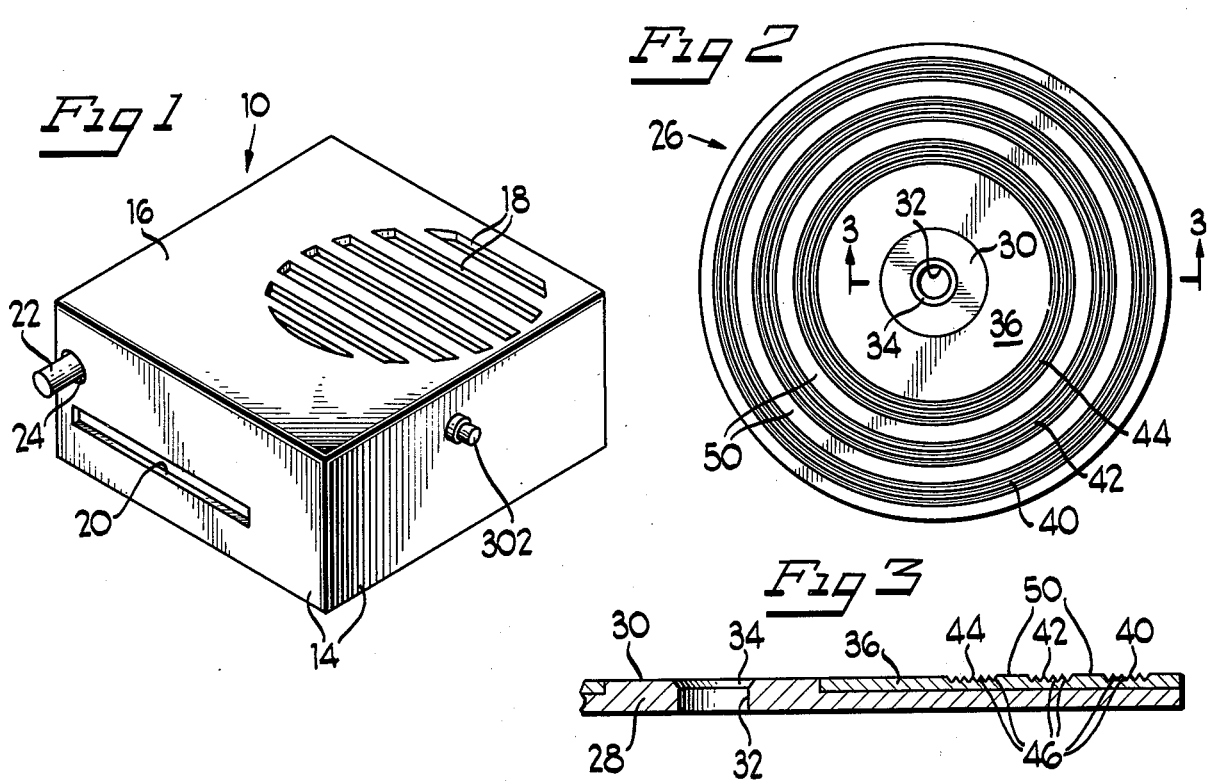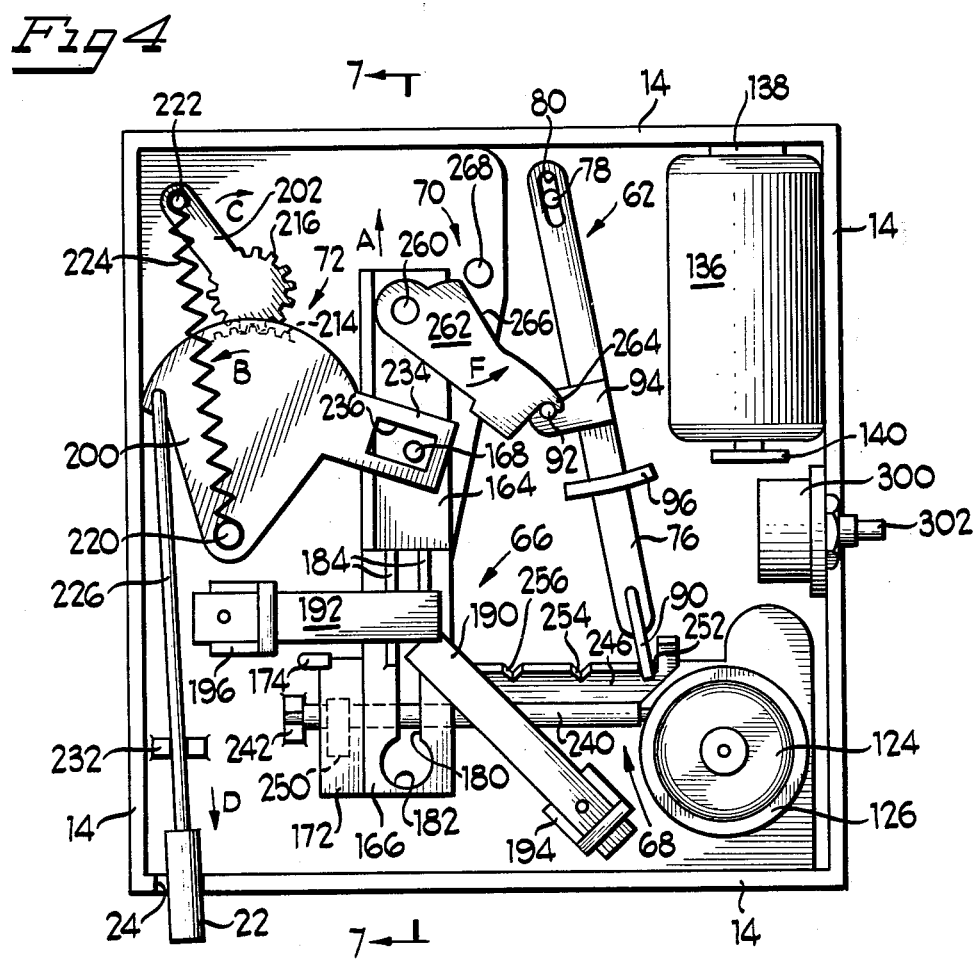

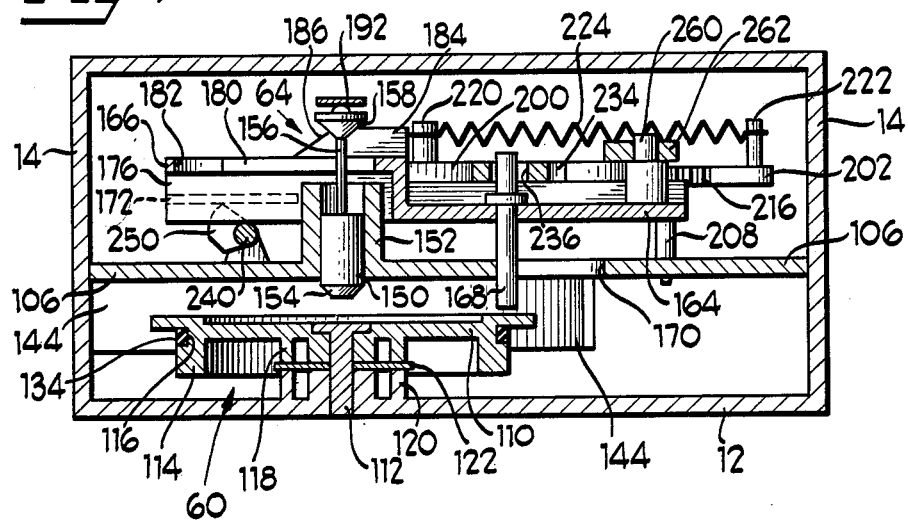
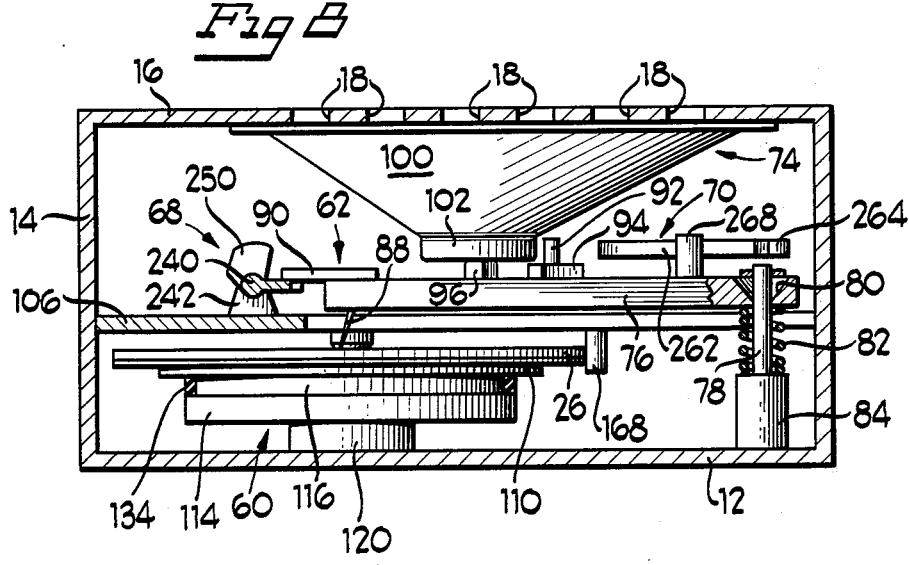
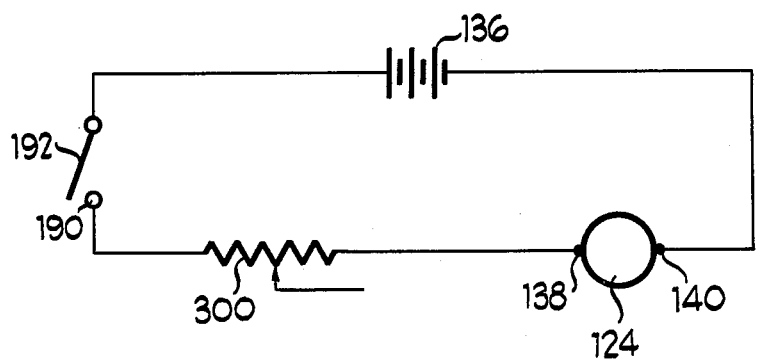

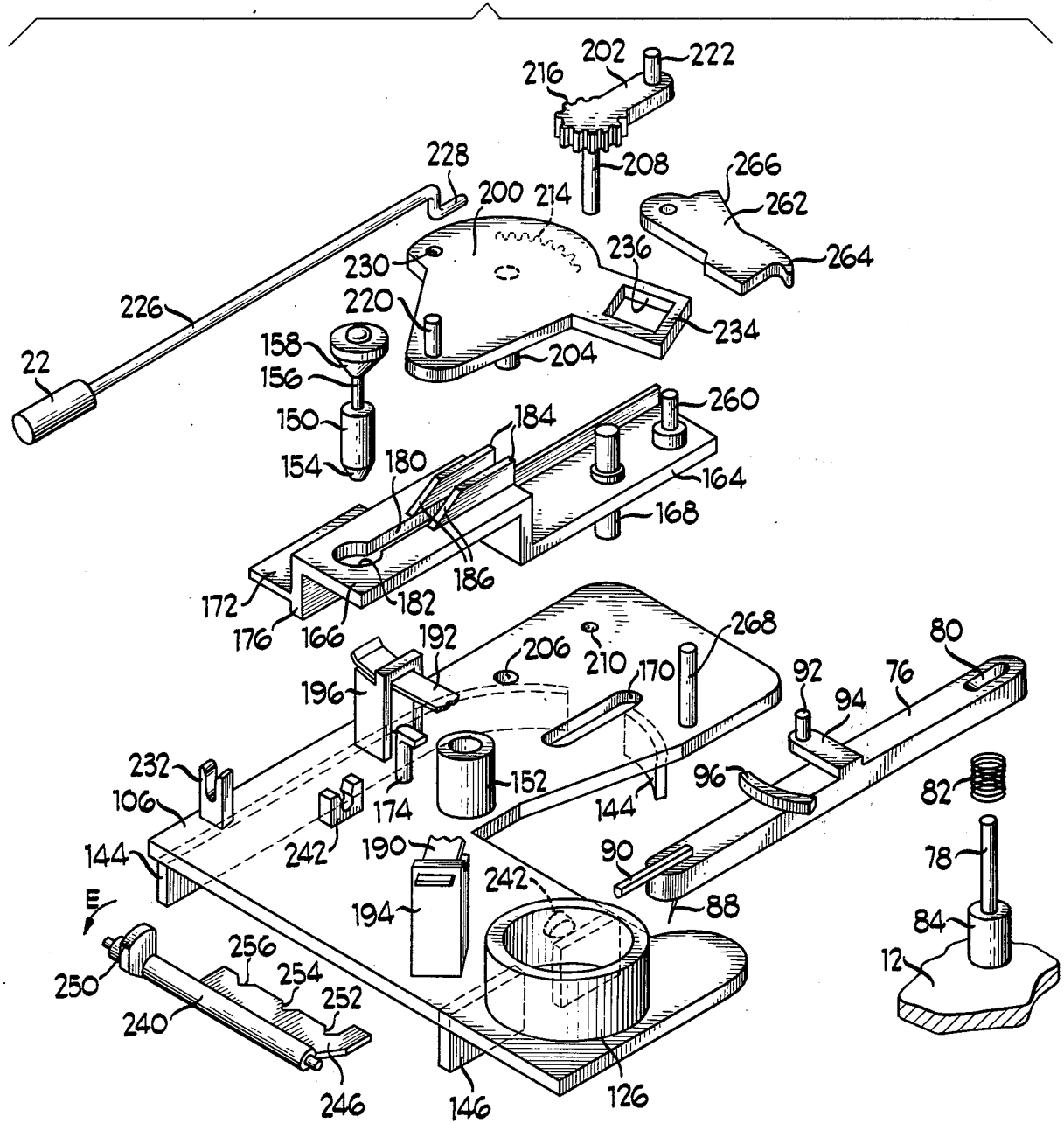

PHONOGRAPH DEVICE

BACKGROUND OF THE INVENTION

This invention relates to toy phonographs and particularly to a phonograph device in which the playback mechanism is activated by inserting the record through a slot formed in one side of the phonograph.

The entertainment value of toys such as board games could be enhanced by including a toy phonograph which gives the players audible instructions for playing the game. Most audible producing toys generally have been constructed so that one record permanently remains in the phonograph mechanism. Greater entertainment and amusement can be provided by enabling a change of the records. However, a mechanism that allows for a change of records still must operate in a simple manner without requiring instructions to children as to how to operate it, and with high resistance to damage from improper use. Furthermore, such a toy phonograph must be constructed so that it can be produced at very low cost to enable it to be included with toys or games that sell at a reasonably low price.

Phonographs which presently are adapted to use interchangeable records have a mechanism which will always reset the tone arm to the periphery of the newly inserted record, and therefore will always begin a new playing each record from the beginning. If a phonograph of this type is to be used in conjunction with a game, the audible instructions can be predetermined by the players of the game just by remembering what instructions are included on what record.

SUMMARY OF THE INVENTION

It is an object of the present invention to provide an economical toy phonograph that can play interchangeable records and which automatically indexes the tone arm mechanism to spaced sections of a record to make it difficult for the players of a game to know beforehand what message is to be played by the phonograph.

In accordance with one embodiment of the present invention a toy phonograph is provided which enables a child to play a record by merely pushing it into a slot and to remove the record by pushing an eject button. The phonograph includes a tone arm assembly and a rotatably mounted turntable within a small relatively compact housing. A slot is provided in the front of the housing for placing a record on the turntable. Insertion of the record activates a cam means and an overcentering device which lowers a spindle into the center of the record and biases the cam means in the play position. The cam means energizes a small electric motor which rotates the turntable. An eject button is provided on the front of the housing which will rotate the overcentering mechanism to cause the cam means to eject the record. A tone arm return means is associated with the cam means to return the tone arm to the periphery of the record only after an innermost concentric recorded message has been played. In the illustrated embodiment, the record has three concentric spaced recorded sections of different messages. At the end of each section of the record the spiral groove has a dead end or circular groove which stops the inward travel of the tone arm so that the record must be ejected to play the next section. When the record is reinserted or a new record is inserted the phonograph will index the tone arm to play the next, interadjacent recorded message. Similarly, the innermost or third recorded message can be played, and, upon ejection of the record after playing the last section, the tone arm return means will move the tone arm back to the periphery of the record to then play the first or outermost record section.

BRIEF DESCRIPTION OF THE DRAWINGS

FIG. 1 is a perspective view of a toy phonograph constructed in accordance with the present invention;

FIG. 2 is a top plan view of one of the records constructed in accordance with the present invention for use with the toy phonograph of FIG. 1;

FIG. 3 is a fragmented vertical section, on an enlarged scale, taken generally along the line 3—3 of FIG. 2;

FIG. 4 is a top plan view, on an enlarged scale and with the top wall and speaker assembly removed, of the phonograph of FIG. 1 in the eject or non-playing position.

FIG. 7 is a vertical section taken generally along the line 7—7 of FIG. 4;

FIG. 8 is a vertical section taken generally along the line 8—8 of FIG. 5;

FIG. 9 is a schematic representation of the electrical components of the present invention; and FIG. 10 is an exploded, perspective view of certain of the operative components of the present invention.

DESCRIPTION OF THE PREFERRED EMBODIMENT

Figure 5:
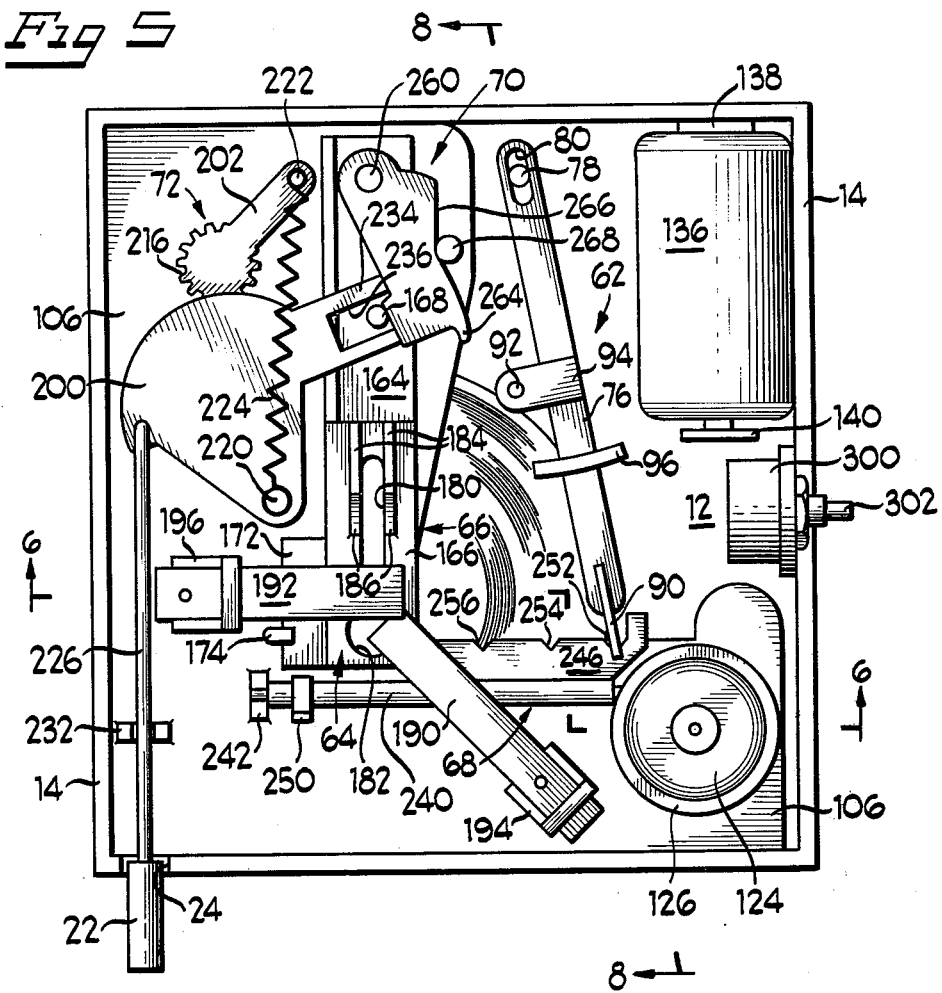
FIG. 5 is a top plan view similar to FIG. 4 showing the phonograph in the playing position.
Figure 6:
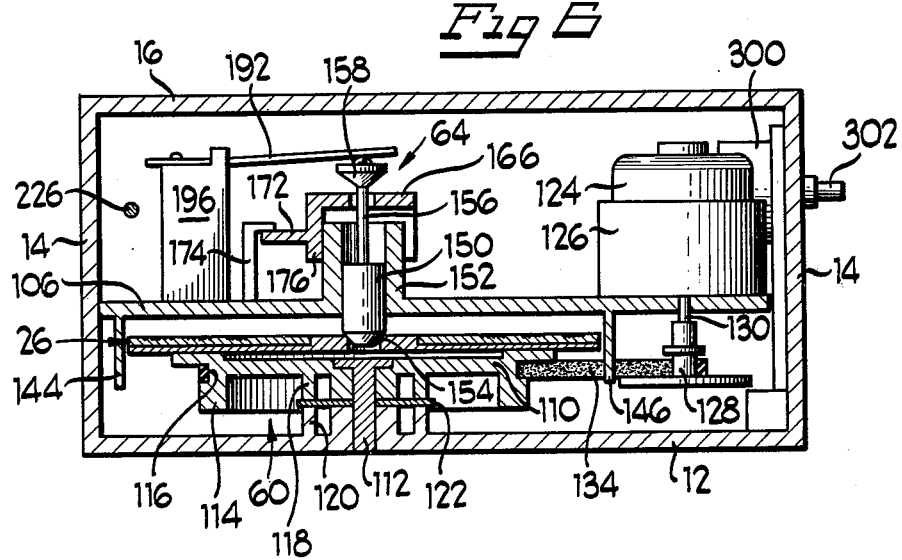
FIG. 6 is a vertical section taken generally along the line 6—6 of FIG. 5.

FIG. 1 of the drawings shows the preferred embodiment of the phonograph of the present invention, generally designated 10. The phonograph 10 has a generally rectangular housing having a base or bottom wall 12, four side walls 14 and a top wall or cover 16. The cover 16 includes a plurality of generally elongated slots 18 which permit sound to escape from the interior of the phonograph. The front wall 14 includes a record receiving slot 20 and an eject button 22 extends through a hole 24.

The phonograph 10 of the present invention is designed to be used in conjunction with a disc type record, generally designated 26, as shown in FIGS. 2 and 3. Referring to FIG. 2, the record disc 26 is comprised of a flat, disc-like portion 28 having an upstanding shoulder or hub portion 30 around a central aperture or spindle hole 32. The spindle hole 32 has a chamfer 34 on the upper surface to facilitate insertion of a spindle as will be described in detail hereinafter. A flat annular recording sheet 36 is fastened to the disc 28 about the hub 30 by using an adhesive or a snap fit about the hub. The recording sheet includes three messages on three separate, spaced sound track sections 40, 42 and 44. The sound track sections 40 through 44 are arranged concentrically about the hub 30 with each portion including a plurality of spirally oriented grooves 46 (FIG. 3). The spiral grooves 46 for each sound track portion 40, 42 or 44 has an ending groove at its centralmost end and a flat portion 50 spaces each section from the next adjacent section. Therefore, as each section 40, 42 or 44 is played the pickup or stylus will stop at the end of each section and the stylus must be moved up and over the flat portion 50 before beginning a new selection. The purpose of the phonograph 10 is to apparently randomly, but actually programmed, play one of the recorded sections 40, 42 or 44 from one of a plurality of record discs 26 without the user being able to tell which section 40, 42 or 44 is going to be played.

With this in mind, referring to FIGS. 4 through 8, the phonograph 10 includes a turntable, generally designated 60, a tone arm assembly, generally designated 62, a vertically movable spindle, generally designated 64, cam means, generally designated 66, for moving the spindle, tone arm control means, generally designated 68, for moving the tone arm, tone arm reset means, generally designated 70, and an overcentering mechanism, generally designated 72, for maintaining the phonograph in either a playing position or an eject non-playing or reset position. The playing position is shown in the drawings by FIG. 5 and the non-playing or eject position is shown in FIG. 4. A speaker cone assembly, generally designated 74 is mounted above the tone arm assembly 62 for transmitting and amplifying the vibrations induced by the record 26.

The tone arm assembly 62 includes a tone arm 76 which is pivotally mounted on an upstanding shaft 78 provided on the base or bottom wall 12 of the housing. An elongated slot 80 in the tone arm fits over the pin 78 and permits both vertical and horizontal pivotal movement of the tone arm. A spring 82 (FIG. 10) is disposed about the pin 78 between the tone arm 76 and an enlarged cylindrical portion 84 of the pin 78 to bias the end of the tone arm 76 upwardly.

The tone arm 76 includes a stylus 88 for tracking the grooves 46 of the records. A forwardly extending tab 90 is provided on the end of the tone arm 76 for engagement with the tone arm control means 68, as will be described hereinafter. The tone arm also includes a return pin 92 mounted on a return pin extension 94 for use in conjunction with the tone arm reset means 70. Finally, the tone arm 76 includes an arcuate armature contact rib 96 which transmits the vibrations from the stylus to the speaker cone assembly 74.

The speaker cone assembly 74 includes a somewhat flexible cone 100 which is mounted on the underside of the top wall 16 of the housing. An armature 102 is provided on the lower end of the speaker cone 100 to contact the arcuate armature contact rib 96 of the tone arm. The speaker cone 100 is slightly flexible and in conjunction with the spring 82 acts to bias the stylus 88 into contact with the grooves 46 of the records 26. Thus as the record rotates, with the stylus 88 in the groove, vibrations will be transmitted through the stylus and through the tone arm to the speaker cone armature 102 and then amplified by the speaker cone 100 and transmitted through the slots 18 in the top wall 16 of the housing.

A horizontal support platform 106 is mounted within the housing to support the remaining components 64 through 72. The turntable 60 is mounted below the platform 106 for supporting the records 26. More particularly, referring to FIGS. 6, 7 and 8, the turntable 60 includes a disc 110 which is rotatably mounted about a journal 112 secured to the base 12. The disc 110 includes a depending flange 114 which has a belt groove 116 formed therein. An enlarged central, cylindrical portion 118 of the disc 110 engages a similar upwardly extending cylindrical portion 120 of the base 12, with a bearing plate 122 therebetween, to add horizontal stability to the turntable. The turntable 60 is driven by an electric motor 124 which is mounted in a cylindrical flange 126 provided on top of the platform 106. A pulley 128 is mounted on the motor shaft 130 for driving a belt 134 which passes around the belt groove 116 of the turntable. One or more batteries 136 are provided for energizing the motor 124. The battery 136 is mounted between two spring contacts 138 and 140 mounted on the base 12 (FIG. 5).

When the user desires to play the phonograph, a record 26 must be inserted through the slot 20 in the front of the phonograph 10 and positioned onto the turntable 60. To assist in proper alignment of the record 26 two depending flanges 144 and 146 are provided on the underside of the platform 106. The lefthand flange, as viewed in FIG. 10, is curved toward the rearward end to generally encircle the back of the turntable 60. This curved portion of the flange prohibits the user from inadvertently damaging the phonograph by pushing the record in too far. The righthand flange 146 is divided in two portions to provide a slot 148 through which the drive belt 134 can pass to the motor pulley 128.

The movable spindle 64 is provided above the turntable to engage the hole 32 in the center of the record 26 and properly align it for tracking by the stylus 88. More particularly, referring to FIGS. 6 and 7, the spindle includes a lower cylindrical portion 150 which is slidably mounted in a cylindrical journal 152 formed in the platform 106. The bottom end or nose 154 of the spindle portion 150 is tapered to engage the chamfered section 34 of the record 26 for proper alignment. The spindle portion 150 is secured by a smaller shaft 156 to a top, tapered, cam follower 158 which cooperates with the cam means 66 for up and down movement as is described in detail below.

The cam means 66 includes an offset slider plate 164 which has a raised forward portion 166. The slider plate 164 is mounted to slide toward the rear of the phonograph during insertion of a record. More particularly, a pin 168 depends from the plate 164 through an elongated slot 170 formed in the platform 106 for engagement with the periphery of the record as it is inserted through the record receiving slot 20. When the record is inserted, the contact by the pin 168 moves the slider plate from its eject position as shown in FIG. 4 to the play position as shown in FIG. 5. The forward portion of the slider plate 166 includes a horizontally directed flange 172 which engages an L-shaped upstanding stud 174 on the platform 106 to guide the forward portion of the slider plate. A downwardly extending rib 176 of the slider plate engages the cylindrical housing 152 for added guiding. The pin 168 in the slot 170 guides the rearward portion of the slider plate 166.

A keyhole slot 180 is provided in the slider plate portion 166 for clearance of the shaft 156 of the spindle. A circular opening 182 of the keyhole slot allows for insertion of the spindle therethrough during assembly but is not used during operation of the phonograph 10. A cam surface is provided for moving the spindle toward and away from the turntable, in the form of two upstanding ribs 184 which have a canted front edge 186. Therefore, during insertion of the record 26 and sliding of the slider plate 164, the cam surfaces 186 allow the spindle to move downwardly into engagement with the record as the cam surface 158 of the spindle moves down the canted surfaces 186.

The up and down movement of the spindle 64 also is used to energize the electric motor 124 to rotate the turntable. More particularly, two electrical contacts 190 and 192 are mounted above the spindle 64 by two upstanding posts 194 and 196 on the platform 106. In its upward position, the spindle 64 biases the contact 192 away from the contact 190. As the record is inserted, and the spindle 64 drops into engagement with the record as the contact 192 moves downward to engage the contact 190 which thereby starts rotation of the turntable and record. When the record is removed (this operation is described below), the slider plate 164 and the cam ribs 184 lift the spindle 64 and break the circuit by separating the contacts 190 and 192 to de-energize the electric motor 124.

The overcentering device 72 maintains the slider plate 164 in its play position (FIG. 5) and also ejects the record 26 when the eject button 22 is pushed by the user. Referring to FIGS. 4 and 5, the overcentering mechanism 72 includes a pivotally mounted locking plate 200 and an overcentering crank 202. The locking plate 200 includes a depending shaft 204 which is mounted in a journal 206 provided in the platform 106. Similarly, the overcentering crank 202 includes a depending shaft 208 which is mounted in a journal 210 also formed in the support platform 106. The locking plate includes an arcuate rack 214 of approximately 90° which meshes with matching gear teeth 216 on the overcentering crank 202 when the locking plate 200 and the crank 202 are mounted in the journals 206 and 210 (FIG. 10). An upstanding pin 220 is provided on the locking plate and a similar pin 222 is provided on the overcentering crank 202. These pins are connected by a spring 224 to constantly bias the meshing gear teeth 214 and 216.

The eject button 22 is connected by an elongated shaft 226 to the locking plate 200. An offset portion 228 of the shaft 226 engages a hole 230 in the locking plate for pivotal attachment thereto. The shaft 226 additionally is supported by a guide stud 232 on the support platform 106. The locking plate 200 includes an extended tab 234 which includes a generally rectangular cutout 236 for engagement with the upwardly extending portion of the pin 168 on the slider plate 164. The assembly of these components is shown in the eject position in FIG. 4. As a record is inserted through the record receiving slot 20, it will engage pin 168 on the underside of the slider plate and the slider plate will move toward the rear of the phonograph in the direction of arrow A (FIG. 4) to the "play" position shown in FIG. 5. The pin 168 on top of the slider plate will engage the rectangular opening 236 in the locking plate and cause the locking plate to rotate in a counterclockwise direction shown by arrow B (FIG. 4). This rotation will cause the overcentering crank 202 to rotate in a clockwise direction as shown by arrow C. At a midway point during this rotation, when the spring is in alignment with the crank arm portion 202 (through the pivot for the crank arm), the biasing force of the spring will continue to rotate the crank arm until it assumes the position as shown in FIG. 5. The locking plate also will rotate to the position as shown in FIG. 5. The spring 224 then biases and maintains the overcentering components 200 and 202 in this playing position. During rotation of the locking plate 200, the shaft 226, and thus the eject button 22, move forwardly in the direction of arrow D.

When it is desired to eject a particular record 26, the user simply depresses the eject button 22 which rotates the locking plate 200 in a clockwise direction opposite that of arrow B (FIG. 4) and the overcentering crank in a counterclockwise direction opposite that of arrow C. This rotation causes the aperture 236 to engage the pin 168 and move the slider plate 164 forward thereby ejecting a record. During this forward movement of the slider plate, the spindle is raised and the motor 124 de-energized. The overcentering components, during an ejection of a record, will move from the position as shown in FIG. 5 (the play position) to the position as shown in FIG. 4 (the eject position).

The tone arm control means 68 is provided to lift the tone arm from the record groove and replace the tone arm on the record. The tone arm control means 68 includes a shaft 240 which is pivotally mounted at its reduced opposite ends by two journals or upstanding tabs 242 formed on the platform 106. The shaft 240 includes a generally elongated flange 246 which is maintained in a generally horizontal plane in the playing position and is raised generally 45° from the horizontal in the eject position. The lefthand portion of the shaft 240, as viewed in the drawings, includes a tab or cam 250. The flange 246 includes three V-shaped detents 252, 254 and 256.

The cam 250 is in alignment with the guide rib 172 of the slider plate so that on movement to the eject position the guide flange 172 rotates the cam 250 downward in the direction of arrow E (FIG. 10) to thereby rotate the flange 246 upward and raise the tone arm by contacting the extension 90 thereof to raise the stylus 88 off of the record. As a record is inserted, the slider plate moves in the direction of arrow A and thereby releases the cam 250. The spring biasing force of the speaker cone 100 on the tone arm 76 causes the tab 90 on the tone arm 76 to depress the flange 246 and thus rotate the flange downwardly until the stylus 88 engages one of the grooves in the record. Thus, it can be seen that the tone arm control means 68 will lift the tone arm from the record when the eject button is depressed and will also lower the tone arm and the stylus onto the record as a record is inserted into the phonograph.

The detents 252, 254 and 256 are provided on the flange 246 to move or index the tone arm and stylus over the flat surfaces 50 between the record sections 40, 42 and 44. More particularly, at the end of each record section there is located a deadend groove or simply a circular groove. This groove causes the tone arm to stop moving inwardly and to signal the end of a message. However, to reach the next record section, the tone arm must be lifted and moved radially so that the stylus will clear the dead or flat portion 50 between the record sections. This is accomplished by use of the V-shaped notches 252 through 256. As the record is ejected, causing the flange 246 to rotate upwardly, the tab 90 falls downwardly into the bottom of the V-shaped detent, radially of the record. This movement causes the stylus to pass over the dead or flat area 50 of each record. As the next record is inserted, the stylus 88 will be lowered onto the first groove of the following record section. This operation continues until the stylus traverses the third or innermost recorded message of each record.

The tone arm 76 now is in a position to be reset to the outermost periphery for the next recording. The tone arm reset means 70 is provided for this resetting function. Referring to FIG. 4, the tone arm reset means 70 includes an upstanding pin 260 on the rearward portion 164 of the slider plate. A reset arm 262 is pivotally mounted on the pin 260. The reset arm 262 includes a hook portion 264 for engaging the tone arm reset pin 92 and an alignment surface 266 for maintaining proper orientation of the reset arm 262. The alignment surface 266 is in proximity to an upstanding pin 268 formed on the platform 106. In operation, each time a record is inserted into the toy phonograph 10, the slider plate and the reset arm 262 will move rearwardly in the direction of arrow A with the slider plate. This causes the alignment surface 266 to contact the pin 268 and align the reset arm 262 to the position as shown in FIG. 5. When the eject button is depressed the reset arm 262 then will move forwardly with the slider plate 164. If the tone arm had previously played the last record selection (the innermost section), the tone arm return pin 92 would be in a position so as to engage the hook portion 264 of the replay arm. If these portions engage, the forward movement of the slider plate 164 will cause the reset arm 262 to rotate in a counterclockwise direction as shown by arrow F and push the tone arm and stylus to the outermost periphery of the record. This operation is illustrated in FIG. 4. However, if the stylus has just finished playing the first or second selection of the record, the hook portion 264 will not engage the return pin 92 and therefore the tone arm will not be returned to the periphery. The tone arm is only returned to the periphery of the record after playing of the third or innermost recorded message.

Therefore, during use of the toy phonograph 10, the user will be unaware of the position of the tone arm 76 and therefore will be unable to predetermine which message will be heard. This is true, even though the particular user may know what message is contained in each portion of the record since he will not know which portion of the record is going to be played by the phonograph. This indexed playing of different portions on the record makes the phonograph especially useful in board games where it is desired to have messages audibly given to the contestants without them being able to predetermine which message it will be.

FIG. 9 shows a schematic representation of the electrical components of the toy phonograph 10. The battery 136 is connected in series with the contacts 190 and 192 for energizing the motor 124. A manually adjustable rheostat 300 also is connected in series with the battery and motor to allow the user to adjust the speed of the turntable. The rheostat 300 is mounted on the side wall 14 of the housing and has a control knob 302 extending therethrough for manual adjustment by the players.

The foregoing detailed description has been given for clearness of understanding only and no unnecessary limitations should be understood therefrom as some modifications will be obvious to those skilled in the art.

I claim:
1. A toy phonograph comprising, in combination:
a housing including a record-receiving slot;
a turntable rotatably mounted on the housing;
a spindle mounted on the housing to move toward and away from the turntable;
drive means for rotating the turntable;
a tone arm including a stylus, mounted on the housing to track a record groove and to move the stylus off of and onto the record;
cam means including a slider plate having an extended portion for engagement with the periphery of a record to move therewith from a normal eject position to a play position when a record is inserted through the record-receiving slot, and a cam surface engageable with the movable spindle to cause the spindle to move into engagement with the record as the slider plate is moved to the play position during record insertion;
a speaker cone assembly having an armature biased against the tone arm for amplifying vibrations transmitted through the tone arm by the record groove; and
a record comprising a plurality of concentric selections of predetermined size, each selection comprising a spiral groove having an ending circular groove and a blank land area between each of said concentric selections whereby the pickup stylus must be lifted from the record and moved over the land area to the beginning convolution of the next spiral record groove;
tone arm control means for moving the stylus into and out of engagement with the record groove and for moving the tone arm in a plane parallel to the recorded surface, said control means including a pivotally mounted lever means engageable with the slider plate for lifting the tone arm when the slider plate means moves to the eject position, and said lever means including detent means for moving the tone arm in plane to cause the stylus to skip over the intermediate land area of the record to thereby play the next smaller concentric selection when a record is inserted through the slot.

2. The phonograph of claim 1 including an eject button extending through one side of the housing for depressing by the user to move the slider plate to an eject position for removing the record from the phonograph.

3. The phonograph of claim 2 wherein the cam means includes an overcentering mechanism to bias the slider plate in the play position after insertion of a record and to bias the slider plate to the eject position when the eject button is manually depressed.

4. The phonograph of claim 1 tone arm reset means having a reset arm pivotally mounted on the slider plate for engaging and moving the tone arm to the periphery of the record.

5. The phonograph of claim 4 including an aligning pin for engagement with the reset arm to cause the reset arm to engage the tone arm only after the tone arm has traveled to the innermost convolution of the record groove.

6. A toy phonograph comprising:
a housing including a record-receiving slot;
a turntable rotatably mounted on the housing;
drive means for rotating the turntable;
a spindle mounted on the housing to move toward and away from the turntable;
cam means including a slider plate having an extended portion for engagement with the periphery of a record to move therewith from a normal eject position to a play position when a record is inserted through the record-receiving slot, and a cam surface engageable with the movable spindle to cause the spindle to move into engagement with the record as the slider plate is moved to the play position during record insertion;
a tone arm including a stylus mounted on the housing to track a record groove and to move the stylus off of and onto the record;
a tone arm control means including a pivotally mounted lever engageable with said slider plate for lifting the tone arm and detent means on the lever for moving the tone arm in a plane parallel to the plane of the record surface to cause the stylus to skip over a portion of the record when the slider plate moves to the eject position;

an eject knob extending through one side of the housing for depressing by the user to move the slider plate to the eject position for removing the record from the phonograph;

overcentering means engageable with the cam means to bias the slider plate in the play position after insertion of a record and to bias the slider plate in the eject position when the eject knob is manually depressed;

tone arm reset means including a reset arm pivotally mounted on the slider plate for engaging and moving the tone arm to the periphery of the record; and a speaker cone assembly having an armature biased against the tone arm for amplifying vibrations transmitted through the tone arm by the record groove.

7. The phonograph described in claim 6 wherein the tone arm reset means includes an aligning pin for engagement with the reset arm to cause the reset arm to engage the tone arm only after the stylus has traveled to the innermost convolution of the record groove.

8. A toy phonograph comprising:
a housing including a record-receiving aperture;
a turntable rotatably mounted in the housing;
a spindle mounted on the housing for movement toward and away from the turntable;
drive means for rotating the turntable;
a tone arm including a stylus, mounted on the housing to track a record groove and to move the stylus off of and onto the record;

cam means engageable with the spindle for moving the spindle into engagement with the record, said cam means including a slider plate having an extended portion for engagement with the periphery of the record to move therewith from a normal eject position to a playing position when the record is inserted through the record-receiving slot, and a cam surface engageable with the movable spindle to cause the spindle to move into engagement with the record as the slider plate is moved to a play position during record insertion; and tone arm control means for moving the stylus into and out of engagement with the record groove, said tone arm control means including a pivotally mounted lever engageable with the slider plate for lifting the tone arm when the slider moves to an eject position, said lever including detent means for moving the tone arm to a plane parallel to the record surface when the slider plate moves to the eject position to cause the stylus to skip over a portion of the record.

9. The phonograph described in claim 8 including a tone arm reset means including a reset arm pivotally mounted on the slider plate for engaging and moving the tone arm to the periphery of the record.

10. The phonograph described in claim 9 including an aligning pin for engagement with the reset arm to cause the reset arm to engage the tone arm only after the tone arm has traveled to the innermost convolution of the record groove.

* * * * *